US012774027B2

(12) United States Patent
Li et al.

(10) Patent No.: US 12,774,027 B2
(45) Date of Patent: Oct. 27, 2026

(54) CLUTCH DEVICE AND VEHICLE STEERING SYSTEM AND VEHICLE HAVING THE SAME

(71) Applicant: BYD COMPANY LIMITED, Shenzhen (CN)

(72) Inventors: Yong Li, Shenzhen (CN); Sihao Hu, Shenzhen (CN); Qi Huang, Shenzhen (CN); Qicheng Deng, Shenzhen (CN); Min Zhao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 420 days.

(21) Appl. No.: 18/372,523

(22) Filed: Sep. 25, 2023

(65) Prior Publication Data

US 2024/0017763 A1 Jan. 18, 2024

Related U.S. Application Data

(63) Continuation of application No. PCT/CN2022/079297, filed on Mar. 4, 2022.

(30) Foreign Application Priority Data

May 28, 2021 (CN) ......................... 202110588616.5

(51) Int. Cl.
*B62D 5/04* (2006.01)
*F16D 11/10* (2006.01)
*F16D 23/12* (2006.01)

(52) U.S. Cl.
CPC ........... *B62D 5/043* (2013.01); *B62D 5/0409* (2013.01)

(58) Field of Classification Search
CPC .... B62D 1/183; B62D 5/0003; B62D 5/0442; B62D 5/0445; B62D 5/0409; F16D 11/10; F16D 23/12; F16D 23/123
(Continued)

(56) References Cited

U.S. PATENT DOCUMENTS 6,220,385 B1 4/2001 Bohner et al.
6,655,709 B2 12/2003 Sherwin et al.
(Continued)

FOREIGN PATENT DOCUMENTS

CN 104057916 A 9/2014
CN 106573639 A 4/2017
(Continued)

OTHER PUBLICATIONS

CN112960033, English translation. (Year: 2021).*
International Search Report and Written Opinion for Application No. PCT/CN2022/079297, mailed on May 26, 2022, 10 pages.

*Primary Examiner* — Anne Marie M Boehler
(74) *Attorney, Agent, or Firm* — Sheppard Mullin Richter & Hampton LLP

(57) ABSTRACT

A clutch device, includes: a first transmission member and a second transmission member, the first transmission member is configured to move between a jointed position and a disjointed position, when the first transmission member is in the jointed position, the first transmission member is jointed with the second transmission member to transfer torque, and when the first transmission member is in the disjointed position, the first transmission member is disjointed from the second transmission member to stop transferring the torque; and a driving mechanism, including a driving device and a driven member and connected with the driving device and the first transmission member in transmission, the driving device drives the driven member to move to drive the first transmission member to move between the jointed position and the disjointed position, and a direction of movement of the driven member is parallel to a direction of movement of the first transmission member.

19 Claims, 10 Drawing Sheets

(58) Field of Classification Search
USPC .......................................................... 180/402
See application file for complete search history.

(56) References Cited

U.S. PATENT DOCUMENTS

| | | | | |
|---|---|---|---|---|
| 7,469,768 | B2 * | 12/2008 | Chino | B62D 1/163 180/405 |
| 9,868,351 | B2 * | 1/2018 | Cooper | B60K 23/08 |
| 2003/0141134 | A1 * | 7/2003 | Sherwin | B62D 5/003 180/443 |
| 2008/0156572 | A1 | 7/2008 | Kasahara et al. | |
| 2010/0089685 | A1 | 4/2010 | Quehenberger et al. | |
| 2015/0107955 | A1 | 4/2015 | Trönnberg | |
| 2016/0061274 | A1 | 3/2016 | Engerer et al. | |
| 2016/0297468 | A1 | 10/2016 | Izutani et al. | |

FOREIGN PATENT DOCUMENTS

| | | | | | |
|---|---|---|---|---|---|
| CN | 111114620 | A | | 5/2020 | |
| CN | 211568082 | U | | 9/2020 | |
| CN | 211869497 | U | | 11/2020 | |
| CN | 211869498 | U | | 11/2020 | |
| CN | 211969570 | U | | 11/2020 | |
| CN | 112706821 | A | | 4/2021 | |
| CN | 112960033 | A | * | 6/2021 | B62D 5/003 |
| JP | 2002264685 | A | | 9/2002 | |
| JP | 2017116099 | A | | 6/2017 | |

* cited by examiner

CLUTCH DEVICE AND VEHICLE STEERING SYSTEM AND VEHICLE HAVING THE SAME

CROSS-REFERENCE TO RELATED APPLICATIONS

This application is a Continuation Application of International Patent Application No. PCT/CN2022/079297, filed on Mar. 4, 2022, which is based on and claims priority to and benefits of Patent Application No. 202110588616.5, filed on May 28, 2021. The entire content of all of the above-referenced applications is incorporated herein by reference.

FIELD

The present disclosure relates to the field of vehicles, and more particularly to a clutch device, and a vehicle steering system and a vehicle having the same.

BACKGROUND

In the related art, a vehicle steering system is always transferring a steering torque, and transferring of the steering torque cannot be switched off, which causes constant linkage between the vehicle wheels and the steering wheel. With the improvement in emerging functions such as car multimedia and autonomous driving, the vehicle steering system fails to adapt to these emerging functions, resulting in poor use experience of the user.

SUMMARY

The present disclosure solves at least one of the technical problems in related art. The present disclosure provides a clutch device capable of achieving transfer of steering torque and switch-off of transfer of steering torque with a high transmission efficiency and reliability.

The present disclosure also provides a vehicle steering system having the clutch device described above.

The present disclosure further provides a vehicle having the vehicle steering system described above.

A clutch device according to an embodiment in a first aspect of the present disclosure includes: a first transmission member and a second transmission member, where the first transmission member is configured to move between a jointed position and a disjointed position, when the first transmission member is in the jointed position, the first transmission member is jointed with the second transmission member to transfer torque, and when the first transmission member is in the disjointed position, the first transmission member is disjointed from the second transmission member to stop transferring the torque; a driving mechanism including a driving device and a driven member, where the driven member is connected with the driving device and the first transmission member in transmission, the driving device drives the driven member to move to drive the first transmission member to move between the jointed position and the disjointed position, and the direction of movement of the driven member is parallel to that of the first transmission member.

With the clutch device according to an embodiment of the present disclosure, it is provided that the driving device drives the driven member to move to drive the first transmission member to move between the jointed position and the disjointed position and that the direction of movement of the driven member is parallel to that of the first transmission member. In this way, when this clutch device is applied to a vehicle steering system, transfer of torque and switch-off of transfer of torque between the steering wheel and the vehicle wheel can be effectively achieved, so that the vehicle wheel can be prevented from rotating along with the steering wheel during gaming, thereby reducing wears in the vehicle wheel and improving use experience of the user. Also, the efficiency and accuracy of transmission between the driving device, the driven member and the first transmission member are high, so that generation of a bending moment between the first transmission member and the driven member can be effectively avoided, thereby effectively improving the reliability of the clutch device.

According to some embodiments of the present disclosure, the central axis of the driven member and the central axis of the first transmission member both extend along the direction of movement of the driven member, the first transmission member and the driven member are fixed relatively to each other in the axial direction of the driven member, and the first transmission member and the driven member are configured to rotate relatively to each other.

According to some embodiments of the present disclosure, a bearing is disposed between the first transmission member and the driven member, and the bearing comprises an inner ring, an outer ring, and multiple rolling elements configured to roll between the inner ring and the outer ring; and a first shaft shoulder and a first fastener are disposed axially at a first interval on the first transmission member, the inner ring abuts between the first shaft shoulder and the first fastener, a second shaft shoulder and a second fastener are disposed axially at a second interval on the driven member, and the outer ring abuts between the second shaft shoulder and the second fastener, such that the first transmission member and the driven member are fixed relatively to each other in the axial direction of the driven member and rotate relatively to each other in a circumferential direction of the driven member.

According to some embodiments of the present disclosure, the clutch device further includes: a steering shaft, where the first transmission member is sleeved over the steering shaft, the first transmission member and the steering shaft are fixed relatively to each other in the circumferential direction of the steering shaft, and the first transmission member is configured to move relatively to the steering shaft in the axial direction of the steering shaft between the jointed position and the disjointed position.

According to some embodiments of the present disclosure, the driven member includes a lead screw; the driving device includes: a driver; and a third transmission member connected with the driver in transmission, an inner circumferential face of the third transmission member having an inner thread coupled with the driven member.

According to some embodiments of the present disclosure, the driver has an output shaft; where the driving device further includes: a driving member fixed to the output shaft, the driving member coupled with the third transmission member to drive the third transmission member to rotate.

According to some embodiments of the present disclosure, the driving member includes a worm, and the third transmission member includes a worm wheel meshed with the worm.

According to some embodiments of the present disclosure, the clutch device further includes: a controller; and a position detection assembly communicating with the controller, the position detection assembly configured to detect the position of the first transmission member and send a positional signal indicative of the position of the first transmission member to the controller.

According to some embodiments of the present disclosure, the position detection assembly includes: a detector body communicating with the controller; and a detection device disposed on the driven member, where the detection device communicates with the detector body, and the detector body obtains a position of the first transmission member by detecting a position of the detection device and sends a positional signal to the controller.

According to some embodiments of the present disclosure, the detector body includes a sensor body, and the detection device includes a magnet cover and a detection magnet disposed on the magnet cover.

According to some embodiments of the present disclosure, the clutch device further includes: a locking device configured to switch between a locking state and an unlocking state, where when the locking device is in the locking state, the locking device locks the first transmission member in the jointed position, and when the locking device is in the unlocking state, the locking device unlocks the first transmission member.

According to some embodiments of the present disclosure, the locking device includes a locking core; and the driven member has a step portion, where when the locking device is in the locking state, the locking core abuts against the step portion to retain the first transmission member in the jointed position via the driven member, and when the locking device is in the unlocking state, the locking core retracts to be separated from the step portion.

According to some embodiments of the present disclosure, one of the first transmission member and the second transmission member includes at least one protrusion, and the other one of the first transmission member and the second transmission member includes at least one recess; and when the first transmission member is in the jointed position, the protrusion is engaged in the recess, and when the first transmission member is in the disjointed position, the protrusion is disengaged from the recess.

A vehicle steering system according to an embodiment in a second aspect of the present disclosure includes the clutch device according to the embodiment in the first aspect of the present disclosure described above.

A vehicle according to an embodiment in a third aspect of the present disclosure includes the vehicle steering system according to the embodiment in the second aspect of the present disclosure described above.

Additional aspects and advantages of the present disclosure will be presented in the following description. Some of these aspects and advantages will become apparent from the following description or be learned from practices of the present disclosure.

BRIEF DESCRIPTION OF THE DRAWINGS

The foregoing and/or additional aspects and advantages of the present disclosure will become apparent and comprehensible in the description of the embodiments made with reference to the following drawing, in which.

LIST OF REFERENCE NUMERALS

Figure 1:
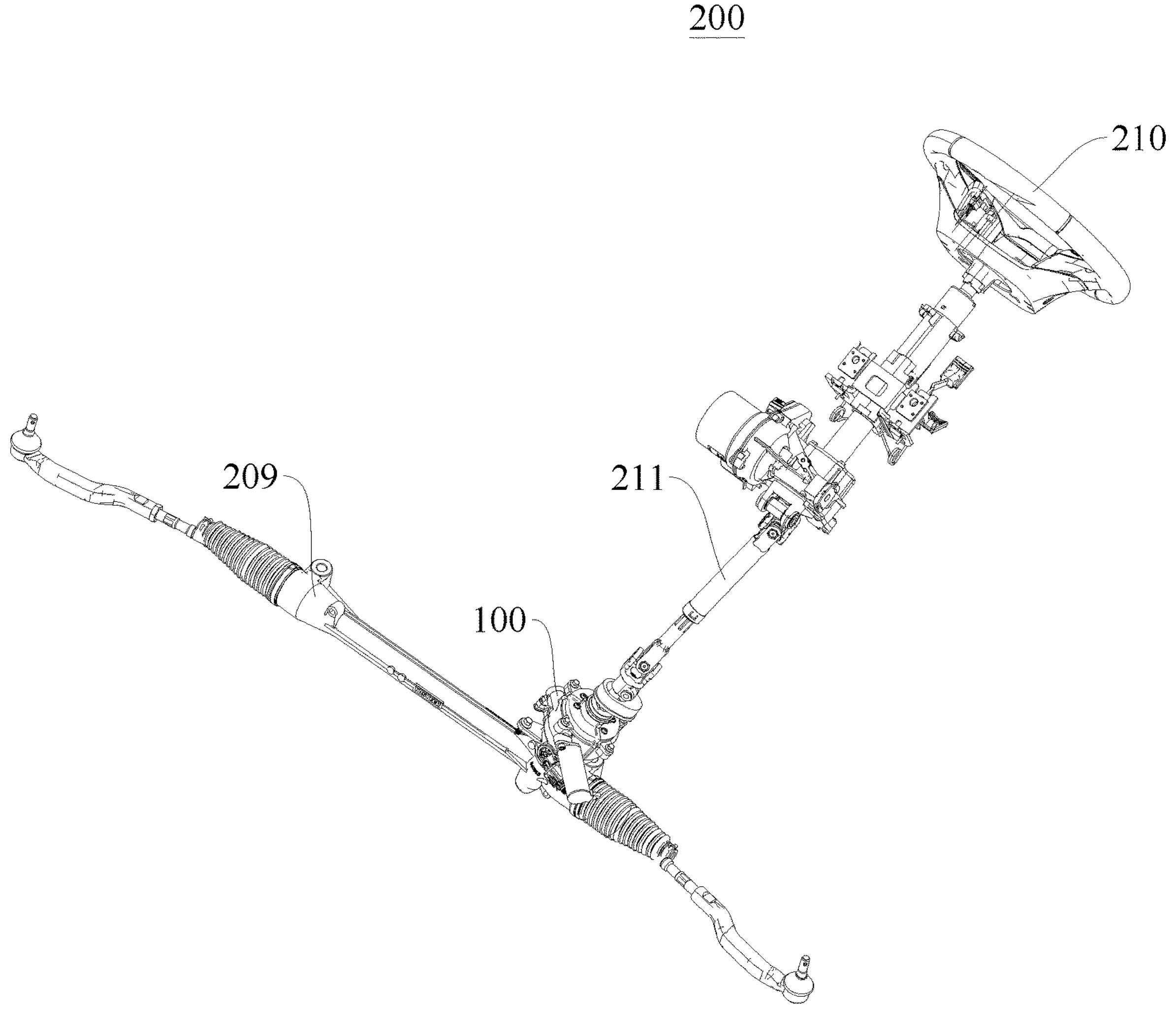
FIG. 1 is a schematic perspective structural view of a vehicle steering system according to an embodiment of the present disclosure.

100: clutch device;
1: first transmission member; 11: protrusion; 12: first fastener; 2: second transmission member; 21: recess;
3: driving mechanism; 31: driving device; 311: driver; 3111: installing screw; 312: third transmission member;
3121: second bearing; 3122: first anti-backlash baffle ring; 3123: second anti-backlash baffle ring; 3124: worm wheel;
313: driving member; 3131: screw plug; 32: driven member; 321: step portion; 3212: second fastener;
4: bearing; 5: steering shaft; 51: third bearing; 511: third anti-backlash baffle ring; 512: fourth anti-backlash baffle ring;
6: ball-slip assembly; 7: position detection assembly; 71: detector body; 711: sensor fixing screw;
72: detection device; 721: magnet cover; 722: detection magnet;
8: locking device; 81: locking core; 82: locking body; 9: oil seal;
200: vehicle steering system;
201: turning-angle limiting mechanism; 202: turning disk; 2021: mating groove; 203: stopper; 2031: guiding shaft;
204: fastener; 2041: guiding groove; 2042: fastening screw; 205: elastic member; 206: shell;
2061: upper shell; 2062: lower shell; 2063: first seal ring; 2064: first bolt assembly;
2065: first bearing; 207: dust-proof cover; 208: support member; 209: steering gear;
2091: steering gear shell; 2092: third seal ring; 2093: second bolt assembly;
2094: needle roller bearing; 210: steering wheel; and 211: steering column.

DETAILED DESCRIPTION

The embodiments of the present disclosure are described in detail below, and the embodiments described with reference to drawings are some embodiments of the present disclosure.

A clutch device 100 according to an embodiment in a first aspect of the present disclosure is described below with reference to FIGS. 1-10. The clutch device 100 can be applied to a vehicle steering system 200. In the description below of the present disclosure, the clutch device 100 applied to the vehicle steering system 200 is an example for illustration.

As shown in FIGS. 4-7, the clutch device 100 according to an embodiment in a first aspect of the present disclosure includes a first transmission member 1, a second transmission member 2, and a driving mechanism 3.

The first transmission member 1 is movable or configured to move between a jointed position and a disjointed position. When the first transmission member 1 is in the jointed position, it is jointed with the second transmission member 2 to transfer torque, and when the first transmission member 1 is in the disjointed position, it is disjointed from the second transmission member 2 to switch off transfer of torque or stop transferring the torque. With such an configuration, when the first transmission member 1 is in the jointed position, synchronized rotation of the first transmission member 1 and the second transmission member 2 is enabled, so that when the clutch device 100 is applied to the vehicle steering system 200, the vehicle steering system 200 can normally transfer the torque from the driver operating the steering wheel 210 to a steering gear 209. When the first transmission member 1 is in the disjointed position, separate the rotation of the first transmission member 1 and the second transmission member 2 is enabled. At this time, the steering wheel 210 is disconnected from the steering gear 209. During the rotation of the steering wheel 210, the steering gear 209 is not driven to move following the steering wheel 210, but the steering wheel 210 can still bring along the components, such as the combined switch, the clock spring, and the angle sensor, to function normally. The steering wheel 210 in this state can serve as a simulator for vehicle driving and output a turning angle signal of the steering wheel 210 to an on-board device or an external device. For example, at this time, the steering wheel 210 can serve as a controller for the car multimedia to play racing games etc., so as to prevent the vehicle wheels from rotating along, which exacerbates wear in the tires, thereby reducing potential safety hazards. Moreover, the rotation of the steering gear 209 does not bring along the steering wheel 210 to move at this time. For example, when the vehicle is in remote control driving or autonomous driving state, the movement of the steering gear 209 controls steering of the vehicle, whereas the steering wheel 210 may not rotate along with the steering gear 209, so as to ensure the safety and riding comfort of the driver.

The driving mechanism 3 includes a driving device 31 and a driven member 32. The driven member 32 is connected with the driving device 31 and the first transmission member 1 in transmission. The driving device 31 drives the driven member 32 to move so as to bring along the first transmission member 1 to move between the jointed position and the disjointed position. Thus, the driving device 31 drives the driven member 32 to move so as to enable the movement of the first transmission member 1, and consequently enable transfer and switch-off of transfer of steering torque between the first transmission member 1 and the second transmission member 2.

Figure 7:
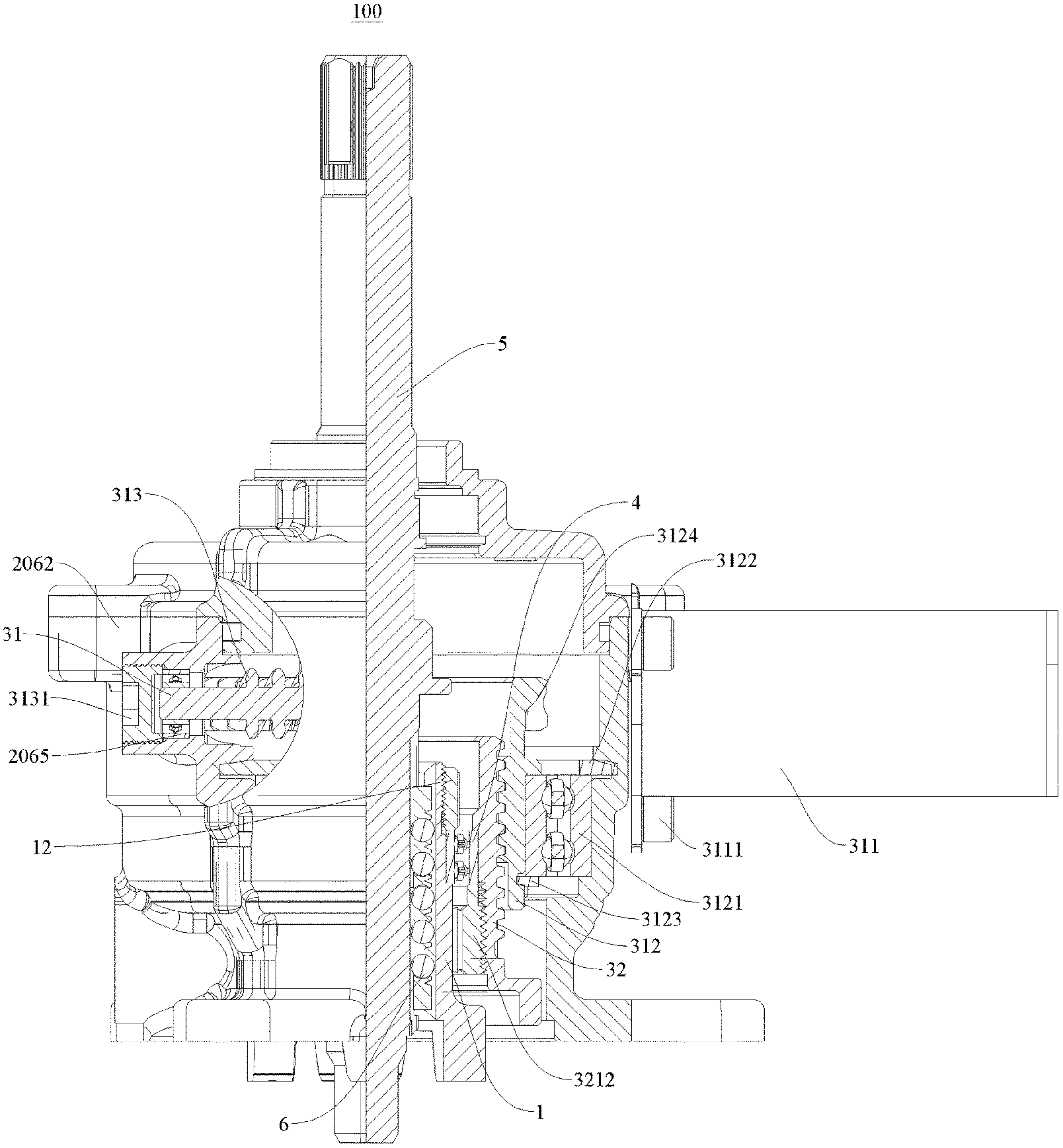
FIG. 7 is another schematic cross-sectional structural view of a clutch device according to an embodiment of the present disclosure.

Referring to FIG. 7, the direction of movement of the driven member 32 is parallel to that of the first transmission member 1. Thus, when the driving device 31 drives the driven member 32 to bring along the first transmission member 1 to move, the direction of the acting force exerted by the first transmission member 1 on the driven member 32 is parallel to the direction of movement of the driven member 32, so as to effectively prevent the first transmission member 1 from generating a bending moment on the driven member 32 and making the mating/coupling between the driving device 31 and the driven member 32 more accurate and reliable. Moreover, the direction of the acting force exerted by the driven member 32 on the first transmission member 1 may be parallel to the direction of movement of the first transmission member 1, so as to prevent the driven member 32 from generating a bending moment on the first transmission member 1, ensure that the first driven member 32 can move along its direction of movement, and consequently effectively improve the smoothness in the motion of the first transmission member 1 and prevent the first transmission member 1 from being stuck during its motion. In addition, with the configuration described above, the transmission path between the driving device 31, the driven member 32 and the first transmission member 1 is short and the transmission can be more accurate, which can effectively improve the transmission efficiency between the driving device 31, the driven member 32 and the first transmission member 1.

With the clutch device 100 according to an embodiment of the present disclosure, it is provided that the driving device 31 drives the driven member 32 to move to bring along the first transmission member 1 to move between the jointed position and the disjointed position, and that the central axis of the driven member 32 is parallel to that of the first transmission member 1. In this way, when the clutch device 100 is applied to the vehicle steering system 200, transfer and switch-off of transfer of torque between the steering wheel 210 and the vehicle wheel can be achieved effectively, so that the vehicle wheel can be prevented from rotating along with the steering wheel 210 during gaming, thereby reducing wears in the vehicle wheel and improving use experience of the user. Also, the efficiency and accuracy of transmission between the driving device 31, the driven member 32, and the first transmission member 1 are high, so that generation of a bending moment between the first transmission member 1 and the driven member 32 can be effectively avoided, thereby effectively improving reliability of the clutch device 100.

In some embodiments of the present disclosure, referring to FIG. 7, the central axis of the driven member 32 and the central axis of the first transmission member 1 both extend along the direction of movement of the driven member 32. The first transmission member 1 and the driven member 32 are fixed relatively to each other in the axial direction of the driven member 32 and the first transmission member 1 and the driven member 32 are rotatable or configured to rotate relatively to each other. For example, in the example shown in FIG. 7, the driven member 32 and the first transmission member 1 may be coaxially arranged/disposed, and the first transmission member 1 and the driven member 32 may be rotatable relative to each other in the circumferential direction of the driven member 32. With such an configuration, on the one hand, deviation of the acting force between the driven member 32 and the first transmission member 1 from the axial direction of them can be effectively prevented, and it is ensured that the driven member 32 generates on the first transmission member 1 only an acting force along the direction of the central axis of the first driven member 32 and that the first transmission member 1 also generates on the driven member 32 only an acting force along the direction of the central axis of the first driven member 32, thereby further improving the efficiency and accuracy of transmission between the driven member 32 and the first transmission member 1; on the other hand, the footprint of the driven member 32 and the first transmission member 1 in the radial direction of the first transmission member 1 can be effectively reduced, so that the clutch device 100 can have a smaller size, which facilitates the spatial layout of other structural members of the vehicle steering system 200. In addition, when the driving device 31 drives the driven member 32 to move, the driven member 32 can bring along the first transmission member 1 to move synchronously in the axial direction of the driven member 32, and the rotation of one of the first transmission member 1 and the driven member 32 can be unaffected by the rotation of the other one, thereby ensuring the reliability in transfer and switch-off of transfer of torque.

In some embodiments of the present disclosure, as shown in FIG. 7, a bearing 4 is provided between the first transmission member 1 and the driven member 32. The bearing 4 includes an inner ring, an outer ring and multiple rolling elements provided to be rollable between the inner ring and the outer ring. A first shaft shoulder and a first fastener 12 are provided axially at an interval on the first transmission member 1, and the inner ring abuts between the first shaft shoulder and the first fastener 12; a second shaft shoulder and a second fastener 3212 are provided axially at an interval on the driven member 32, and the outer ring abuts between the second shaft shoulder and the second fastener 3212, so as to achieve fixing relative to each other in the axial direction and rotation relative to each other in the circumferential direction of the driven member 32 for the first transmission member 1 and the driven member 32.

For example, in the example shown in FIG. 7, a first fastener 12 such as an outer lock nut is fixed to an end of the first transmission member 1, and a second fastener 3212 such as an inner lock nut is fixed to the end of the driven member 32 away from the first fastener 12. One end of the outer ring of the bearing 4 abuts against the second shaft shoulder and the other end of the outer ring of the bearing 4 abuts against the second fastener 3212 to achieve axial positioning of the outer ring of the bearing 4. One end of the inner ring of the bearing 4 abuts against the first shaft shoulder and the other end of the inner ring of the bearing 4 abuts against the first fastener 12 to achieve axial positioning of the inner ring of the bearing 4. As such, with the configuration of this bearing 4, mounting and positioning of the first transmission member 1 and the driven member 32 can be effectively achieved to provide desirable support for the first transmission member 1 and the driven member 32 so that they can sustain large axial load; and the coaxiality of the first transmission member 1 and the driven member 32 can be ensured, so that fixing relative to each other in the axial direction and rotation relative to each other in the circumferential direction for the first transmission member 1 and the driven member 32 can be achieved while the service life of the first transmission member 1 and the driven member 32 can be effectively prolonged. The bearing 4 may be a double-row angular contact bearing but is not limited thereto.

In a further embodiment of the present disclosure, as shown in FIGS. 6-9, the clutch device 100 further includes a steering shaft 5. The first transmission member 1 is sleeved over the steering shaft 5. The first transmission member 1 and steering shaft 5 are fixed relatively to each other in the circumferential direction of the steering shaft 5, and the first transmission member 1 is movable relative to the steering shaft 5 in the axial direction of the steering shaft 5 between the jointed position and the disjointed position. For example, an upper end of the steering shaft 5 may be connected with the steering wheel 210 in transmission, and the second transmission member 2 may be provided on the steering gear 209. While the vehicle is traveling normally on the road surface, the first transmission member 1 is in the jointed position. While the driver is operating the steering wheel 210 for steering, the steering torque exerted on the steering wheel 210 by the driver can be transferred to the steering shaft 5. As the first transmission member 1 and the steering shaft 5 are fixed relatively to each other in the circumferential direction of the steering shaft 5, the steering shaft 5 can transfer the steering torque to the first transmission member 1 and finally from the first transmission member 1 to the second transmission member 2, and eventually to the vehicle wheel, thereby achieving steering of the vehicle.

As such, by making the first transmission member 1 and the steering shaft 5 fixed relatively to each other in the circumferential direction, the steering shaft 5 can transfer the steering torque from the steering wheel 210 to the first transmission member 1, so that steering of the vehicle can be achieved effectively when the first transmission member 1 is in the jointed position. By making the first transmission member 1 and the steering shaft 5 rotatable relative to each other in the axial direction, the first transmission member 1 can be prevented from affecting the steering shaft 5 during movement between the disjointed position and the jointed position. Moreover, by making the first transmission member 1 movable in the axial direction of the steering shaft 5 between the jointed position and the disjointed position, transfer and switch-off of transfer of torque is achieved while movement of the steering shaft 5 can be prevented. As the size of the first transmission member 1 in the axial direction may be relatively small, disposal of the first transmission member 1 can be more convenient and movement of the first transmission member 1 can be more flexible and reliable.

In some embodiments of the present disclosure, referring to FIGS. 6-9, a ball-slip assembly 6 is provided between the first transmission member 1 and the steering shaft 5. Torque is transferred between the first transmission member 1 and the steering shaft 5 via the ball-slip assembly 6, and movement of the first transmission member 1 and the steering shaft 5 relative to each other in the axial direction of the steering shaft 5 can be achieved via the ball-slip assembly 6. For example, in the example shown in FIGS. 6-9, the ball-slip assembly 6 may include a ball-slip outer ring, a ball-slip inner ring, and a rolling element. The rolling element is provided between the ball-slip outer ring and the ball-slip inner ring. The ball-slip outer ring may be structurally integral with the first transmission member 1 so as to effectively reduce the sliding resistance and abnormal noise risk for the first driven member 32, and the ball-slip inner ring may be structurally integral with the steering shaft 5 or fixedly connected with the steering shaft 5.

As such, by providing the ball-slip assembly 6 described above, torque transfer and relative movement are achieved between the first transmission member 1 and the steering shaft while the space between the first transmission member 1 and the steering shaft 5 can be eliminated, thereby avoiding the noise generated due to the vibration during the movement of the first transmission member 1, and consequently making the movement of the first transmission member 1 more stable and reliable.

Figure 2:
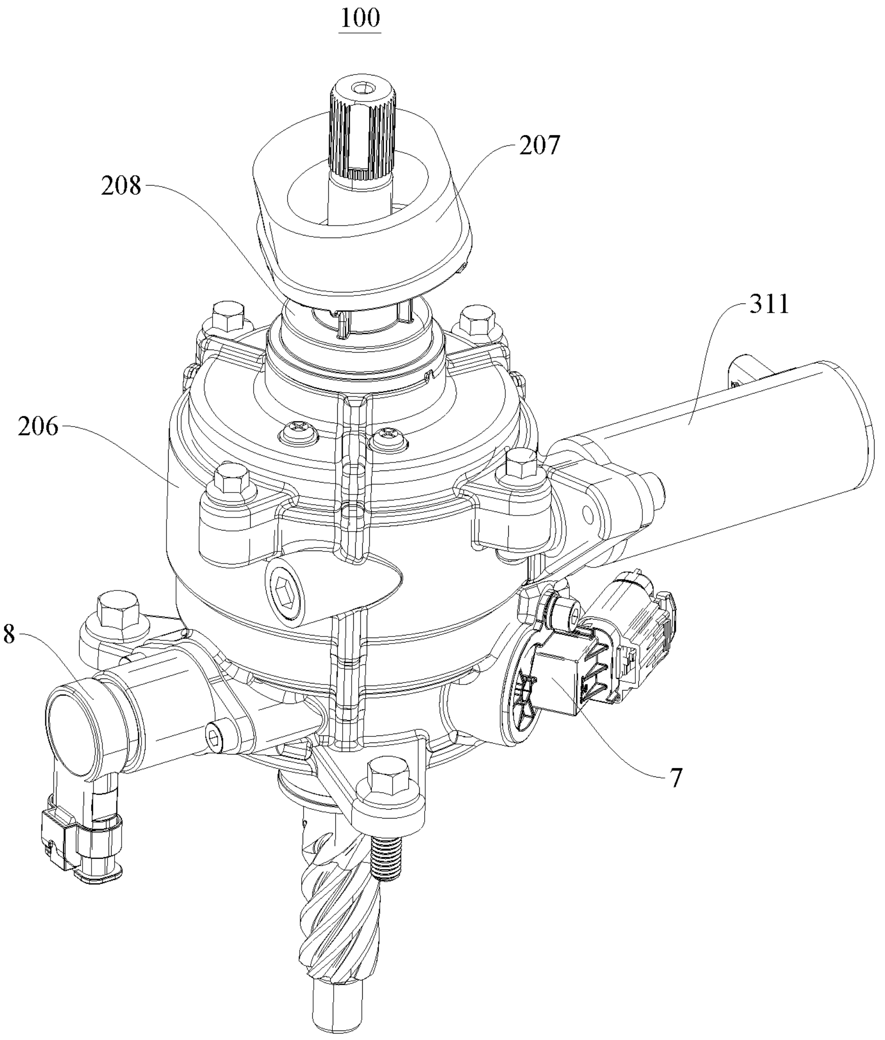
FIG. 2 is a schematic perspective structural view of a clutch device according to an embodiment of the present disclosure.
Figure 3:
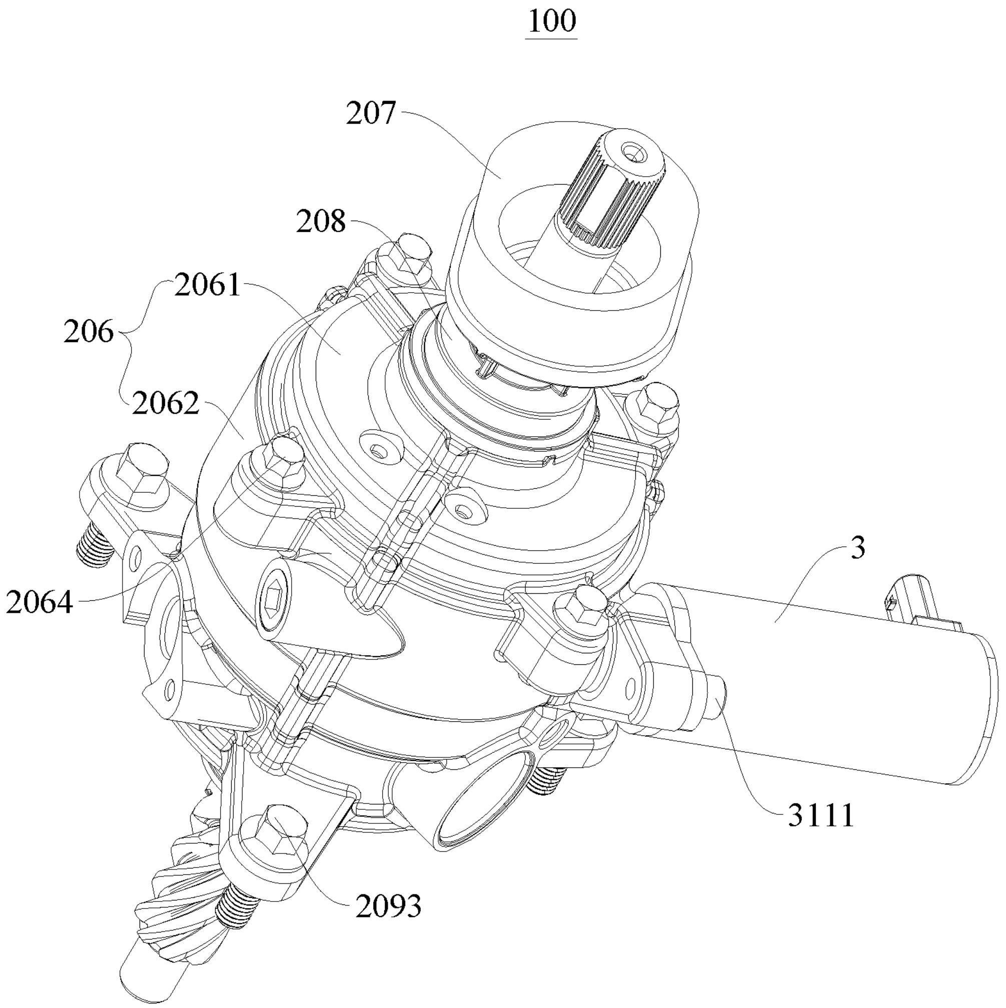
FIG. 3 is a schematic perspective structural view of the clutch device shown in FIG. 2 viewed from another perspective.

In some embodiments of the present disclosure, referring to FIG. 7 in conjunction with FIGS. 2 and 3, the driven member 32 may be a lead screw. The driving device 31 includes a driver 311 and a third transmission member 312.

The third transmission member 312 is connected with the driver 311 in transmission. The inner circumferential face of the third transmission member 312 has an inner thread mated/coupled with the driven member 32. For example, the driver 311 can bring along the third transmission member 312 in rotational motion. As the third transmission member 312 is thread mated with the driven member 32, when the third transmission member 312 rotates, the driven member 32 can move in the axial direction of the third transmission member 312, so as to bring along the first transmission member 1 to move in its axial direction so as to convert rotational motion of the driver 311 into linear motion of the first transmission member 1. Moreover, by controlling the rotation direction of the driver 311, the direction of movement of the first transmission member 1 in the axial direction can be controlled, so that the jointing and disjointing of the first transmission member 1 and the second transmission member 2 can be achieved effectively. In an embodiment, the driver 311 may be a motor, but is not limited thereto.

In a further embodiment of the present disclosure, the driver 311, such as a motor, has an output shaft. The driving device 31 further includes a driving member 313 that is fixed to the output shaft and the driving member 313 is mated/coupled with the third transmission member 312 to bring along the third transmission member 312 to rotate. As such, by providing the driving member 313 described above, the driving member 313 can transfer the driving force from the driver 311, such as a motor, to the third transmission member 312 effectively. In an embodiment, as the driving member 313 is fixed to the output shaft, when the driver 311, such as a motor, is operating, the output shaft can bring along the driving member 313 to rotate. As the driving member 313 is mated with the third transmission member 312, the driving member 313 can bring along the third transmission member 312 to rotate, so that the driven member 32 can bring along the first transmission member 1 to move in the axial direction, thereby achieving switch-off of transfer and transfer of torque.

Figure 4:
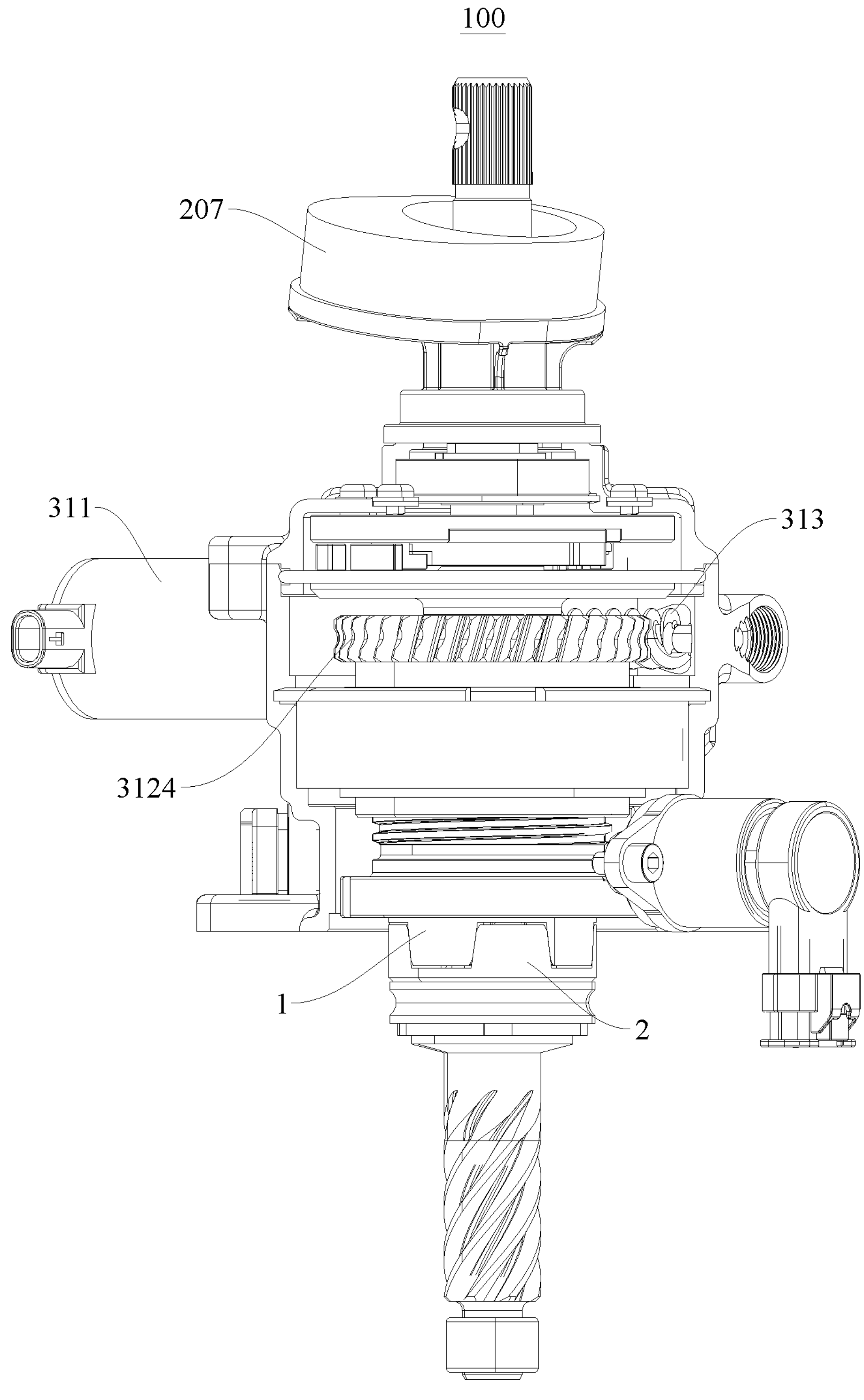
FIG. 4 is a schematic structural view of a clutch device according to an embodiment of the present disclosure, with the first transmission member in a jointed position.
Figure 5:
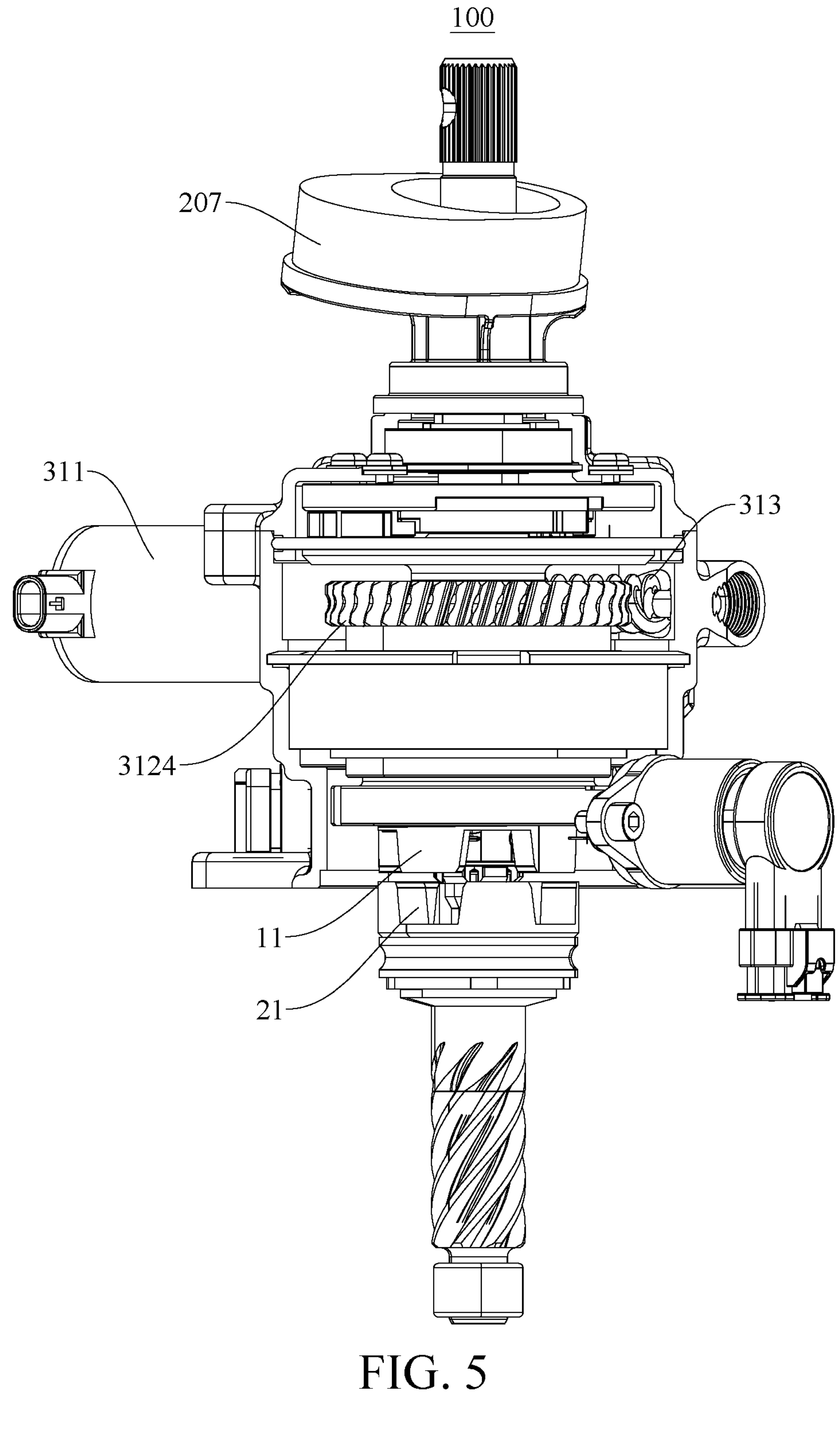
FIG. 5 is a schematic structural view of a clutch device according to an embodiment of the present disclosure, with the first transmission member in a disjointed position.

In an embodiment, as shown in FIGS. 4, 5 and 7, the driving member 313 may be a worm and the third transmission member 312 may include a worm wheel 3124 meshed with the worm. As such, by enabling the worm wheel 3124 to be meshed with the worm, on one hand, the worm and the worm wheel 3124 can form a worm-wheel-3124 and worm pair, and the third transmission member 312 and the driven member 32 can form a thread pair, so as to ensure that driving force from the driver 311 can be transferred effectively to the driven member 32. The transmission is more stable and reliable, which can reduce noise of the clutch device 100. The structure of the worm wheel 3124 and the worm is compact, which can effectively reduce the footprint of the clutch device 100.

The present disclosure is not limited thereto. The transmission between the driving member 313 and the third transmission member 312 may also be made by using a lead-screw-nut pair or a pinion-rack pair, as long as rotational motion of the driver 311, such as a motor, can be converted into linear motion of the driven member 32.

In some embodiments of the present disclosure, the lead angle of the worm is $\gamma$, where $\gamma$ satisfies the condition: $10° \leq \gamma \leq 20°$. With such a configuration, the worm wheel 3124 and worm mechanism may be a self-locking mechanism, so that once the driven member 32 brings along the first transmission member 1 to move in position, the first transmission member 1 can be in a pressed state, allowing more reliable connection. In an embodiment, $\gamma$ may further satisfies the condition $14° \leq \gamma \leq 15°$, but is not limited thereto.

In an embodiment, the condition for the occurrence of self-locking of transmission between the worm wheel 3124 and worm is also correlated with the friction coefficient between the worm wheel 3124 and the worm. Therefore, $\gamma$ is not limited to 10°~20°, e.g., $\gamma$ may be greater than 20° or less than 10°, as long as it can be ensured that self-locking can occur for transmission between the worm wheel 3124 and the worm.

Figure 8:
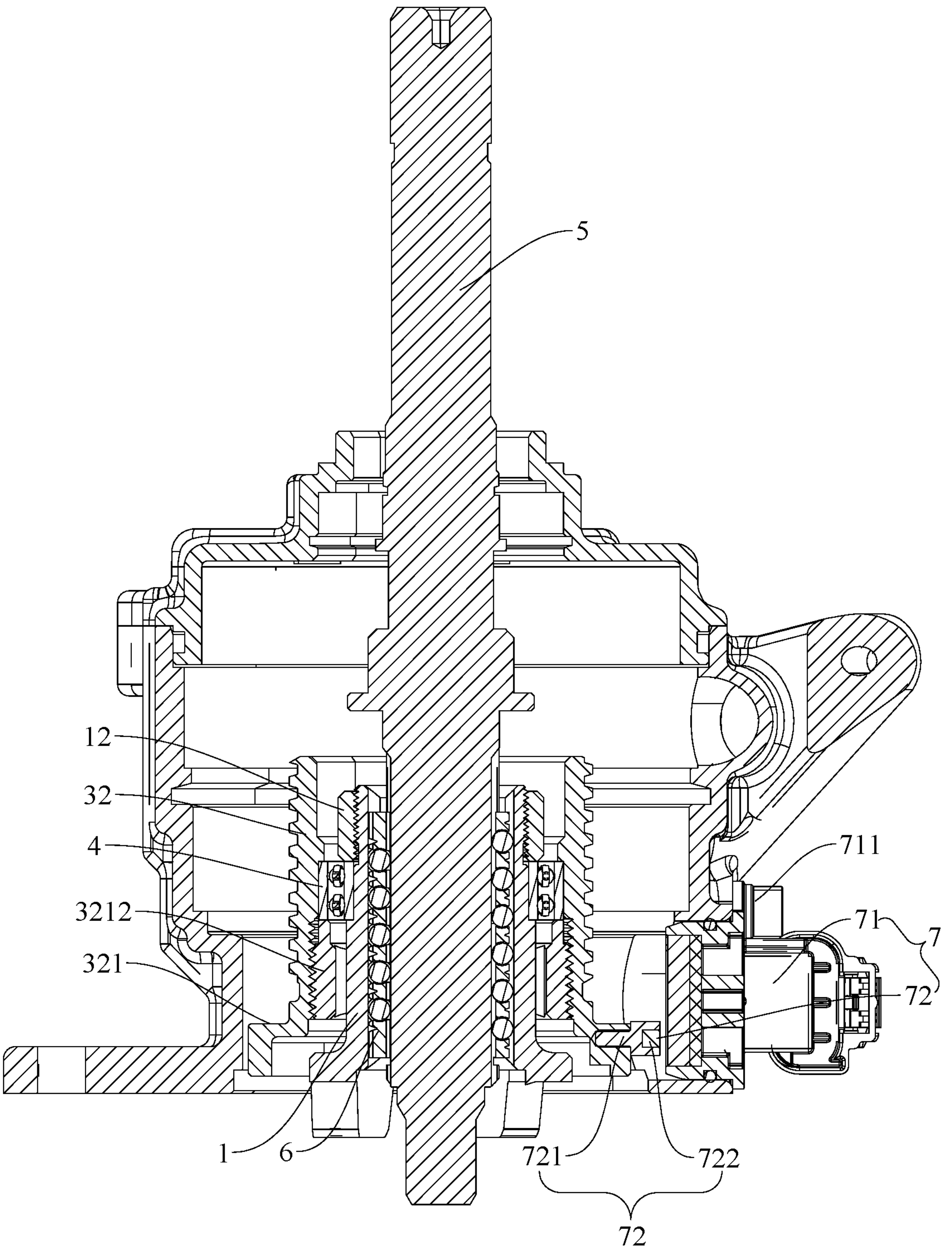
FIG. 8 is a schematic partial cross-sectional structural view of a clutch device according to an embodiment of the present disclosure.

In some embodiments of the present disclosure, referring to FIG. 8, the clutch device 100 further includes a controller and a position detection assembly 7. The position detection assembly 7 communicates with the controller. The position detection assembly 7 is configured to detect the position of the first transmission member 1 and sends the positional signal indicative of the position of the first transmission member 1 to the controller. As such, the position detection assembly 7 provided as such can feed back to the controller the position (e.g., the jointed position and the disjointed position) of the first transmission member 1, so that it can be determined whether steering torque is transferred or transfer of steering torque is switched off between the steering wheel 210 and the vehicle wheel based on the position of the first transmission member 1, and consequently the operating state of the whole vehicle steering system 200 can be obtained.

In some embodiments of the present disclosure, referring to FIG. 8, the position detection assembly 7 includes a detector body 71 and a detection device 72. The detector body 71 communicates with the controller. The detection device 72 is arranged/disposed on the driven member 32. The detection device 72 communicates with the detector body 71. The detector body 71 obtains the position of the first transmission member 1 by detecting the position of the detection device 72 and sends the positional signal of the detection device 72 to the controller. As such, with such a configuration, the detector body 71 can obtain the position of the first transmission member 1 indirectly by detecting the position of the detection device 72 without directly detecting the position of the driven member 32 or the first transmission member 1. As the detection device 72 may have a small size, the disposal of the detection device 72 on the driven member 32 can be convenient, and communication between the detection device 72 and the detector body 71 can be more convenient, so that the detector body 71 can detect the position of the detection device 72 more accurately.

In some embodiments of the present disclosure, referring to FIG. 8, the detector body 71 may be a sensor body, and the detection device 72 may include a magnet cover 721 and a detection magnet 722 provided on the magnet cover 721. For example, in the embodiments of FIG. 8, the sensor body can be fixed to the shell 206 via a sensor fixing screw 711. The central axis of the magnet cover 721 may be parallel to the central axis of the sensor body. The detection magnet 722 may be press fitted in the magnet cover 721, so that the footprint of the detection magnet 722 can be reduced. The magnet cover 721 may be thread mated with the driven member 32, so that the magnet cover 721 can be fixed to the driven member 32 without relative movement between the magnet cover 721, and the magnet and the driven member 32. In this way, the position of the driven member 32 and the first transmission member 1 can be reflected accurately by detecting the position of the detection magnet 722 with high reliability.

Figure 9:
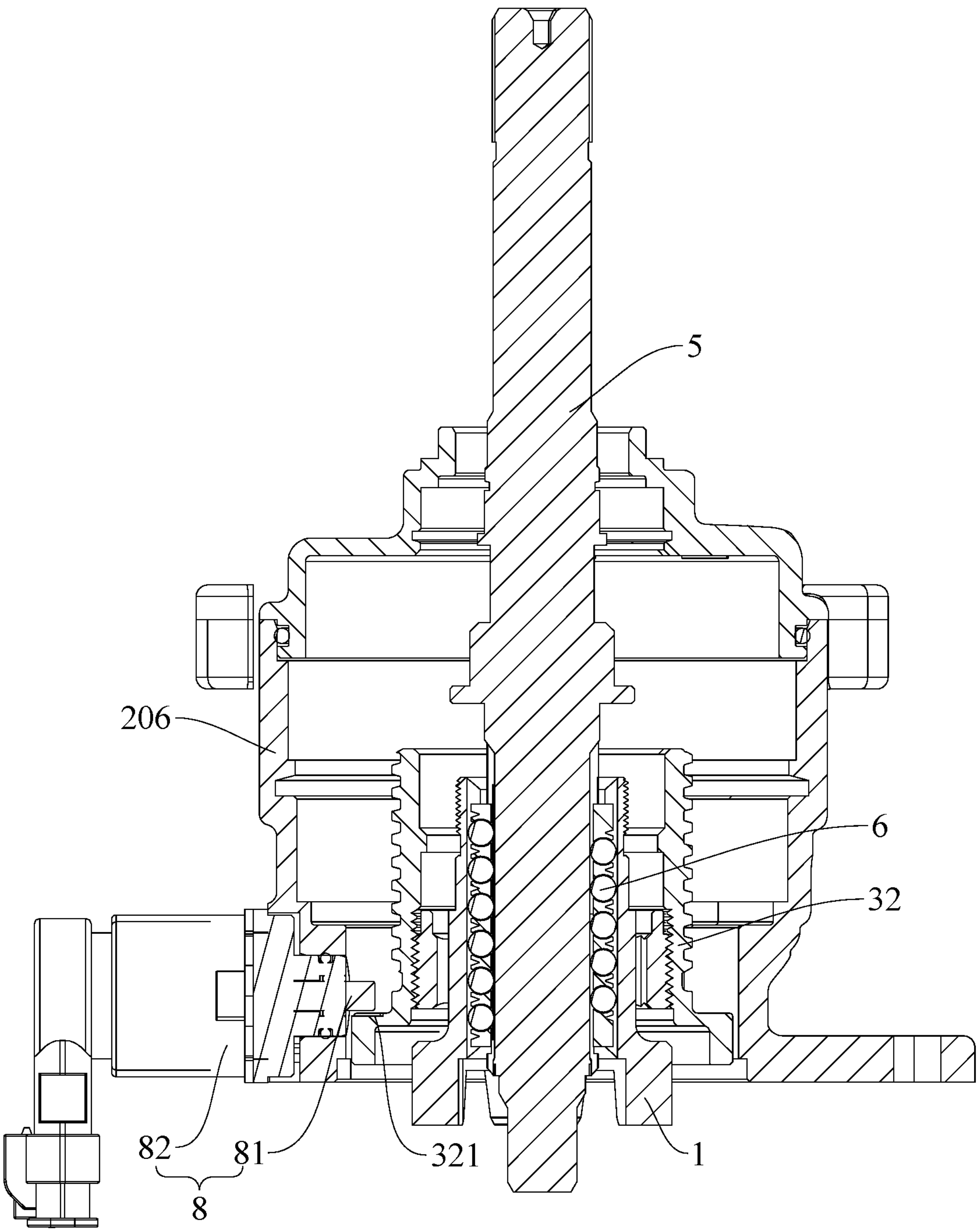
FIG. 9 is another schematic partial cross-sectional structural view of a clutch device according to an embodiment of the present disclosure.

In some embodiments of the present disclosure, as shown in FIG. 9, the clutch device 100 further includes a locking device 8. The locking device 8 is switchable between the locking state and the unlocking state. When the locking device 8 is in the locking state, it locks the first transmission member 1 in the jointed position, and when the locking device 8 is in the unlocking state, it unlocks the first transmission member 1. As such, in the situation such as normal traveling of the vehicle where it is necessary to control steering of the vehicle by the steering wheel 210, the locking device 8 can ensure that the first transmission member 1 is stably in the jointed position, avoiding the case where the first transmission member 1 is disjointed from the second transmission member 2 due to the factors such as bumping, vibration, or control failure of the vehicle, thereby ensuring the stable transfer of steering torque and consequently the safety.

In some embodiments of the present disclosure, referring to FIG. 9, the locking device 8 includes a telescopic locking core 81. The driven member 32 has a step portion 321. When the locking device 8 is in the locking state, the locking core 81 is adapted to abut against the step portion 321 to retain the first transmission member 1 in the jointed position via the driven member 32, and when the locking device 8 is in the unlocking state, the locking core 81 retracts to be separated from the step portion 321. For example, in the embodiments shown in FIG. 9, the locking device 8 further includes a locking body 82. The locking core 81 is provided on the locking body 82, and the locking body 82 may be fixed to the shell 206. When the locking device 8 is in the locking state, the locking core 81 extends from the locking body 82 to abut against the step portion 321 so as to lock the first transmission member 1 in the jointed position. When the first transmission member 1 needs to be disjointed from the second transmission member 2, the controller can send an unlocking signal to the locking core 81, whereupon the locking core 81 can retract into the locking body 82, so that the driven member 32 can bring along the first transmission member 1 to move toward the disjointed position, thus completing the decoupling.

As such, with the configuration of the telescopic locking core 81 described above, when the locking device 8 is in the locking state, the locking core 81 can abut against the step portion 321 to effectively limit movement of the driven member 32 in the axial direction. As the driven member 32 and the first transmission member 1 are fixed relatively to each other in the axial direction, the first transmission member 1 can be indirectly locked in the jointed position, and as the locking core 81 does not need to be in direct contact with the first transmission member 1, influence on rotation of the first transmission member 1 can be avoided.

In some embodiments of the present disclosure, as shown in FIGS. 4, 5 and 7-9, one of the first transmission member 1 and the second transmission member 2 is provided with at least one protrusion 11, and the other one of the first transmission member 1 and the second transmission member 2 is formed with at least one recess 21. When the first transmission member 1 is in the jointed position, the protrusion 11 is engaged in the recess 21, and when the first transmission member 1 is in the disjointed position, the protrusion 11 is disengaged from the recess 21. For example, in the example shown in FIGS. 4, 5, and 7-9, multiple protrusions 11 and multiple recesses 21 are provided. The multiple protrusions 11 may include multiple first protrusions and multiple second protrusions, and the multiple recesses 21 include multiple first recesses and multiple second recesses. The lower end of the first transmission member 1 is provided with multiple first protrusions. The multiple first protrusions are arranged/disposed at intervals in the circumferential direction of the first transmission member 1, with a first recess being defined between every two adjacent first protrusions. The upper end of the second transmission member 2 is provided with multiple second protrusions. The multiple second protrusions are arranged/disposed at intervals in the circumferential direction of the second transmission member 2, with a second recess being defined between every two adjacent second protrusions. When the first transmission member 1 is in the jointed position, the multiple first protrusions are respectively engaged in the multiple second recesses and the multiple second protrusions are respectively engaged in the multiple first recesses. In an embodiment, the protrusion 11 may be formed as a wedge-like protrusion that has a cross section gradually decreasing in a direction away from the corresponding end face, and the recess 21 may be formed as a wedge-like recess that has a cross section gradually decreasing in a direction from the recess opening towards the recess bottom. The shape of the wedge-like protrusion matches with that of the wedge-like recess. In the description of the present disclosure, the word "multiple" means two or more.

As such, with the configuration of the protrusion 11 and the recess 21 described above, when the first transmission member 1 is in the jointed position and a pressing force is applied to the first transmission member 1 and the second transmission member 2, the protrusion 11 can be tightly mated with the recess 21, thereby eliminating the space between the first transmission member 1 and the second transmission member 2, which facilitates the reliable transfer of the steering torque.

It should be noted that, the clutch device 100 according to an embodiment of the present disclosure is of a jaw clutch type (i.e., the first transmission member 1 and the second transmission member 2 are mated/coupled via the protrusion 11 and the recess 21). However, the present disclosure is not limiting in this respect. For example, the clutch device 100 may be another harsh clutch; or an electromagnetic clutch type is adopted to drive an electromagnet directly for decoupling. In an embodiment, the clutch device may be a frictional clutch, a hydraulic clutch, or the like.

A vehicle steering system 200 according to an embodiment in a second aspect of the present disclosure includes the clutch device 100 according to an embodiment in the first aspect of the present disclosure. For example, the vehicle steering system 200 may include a steering wheel 210 and a steering gear 209. The steering wheel 210 may be connected with the first transmission member 1 in transmission to achieve transfer of steering torque. The steering gear 209 may be connected with the second transmission member 2 in transmission to achieve transfer of steering torque. In an embodiment, the second transmission member 2 and the steering gear 209 may be flange connected via end faces and fastened via a threaded fastener, such as a bolt.

In the vehicle steering system 200 according to an embodiment of the present disclosure, with the clutch device 100 described above, transfer and switch-off of transfer of torque between the steering wheel 210 and the vehicle wheel can be achieved effectively, so that the vehicle wheel can be prevented from rotating along with the steering wheel 210 during gaming, thereby reducing wears in the vehicle wheel and improving use experience of the user. Also, the transmission efficiency is high, so that the reliability of the vehicle steering system 200 can be effectively improved.

Figure 10:
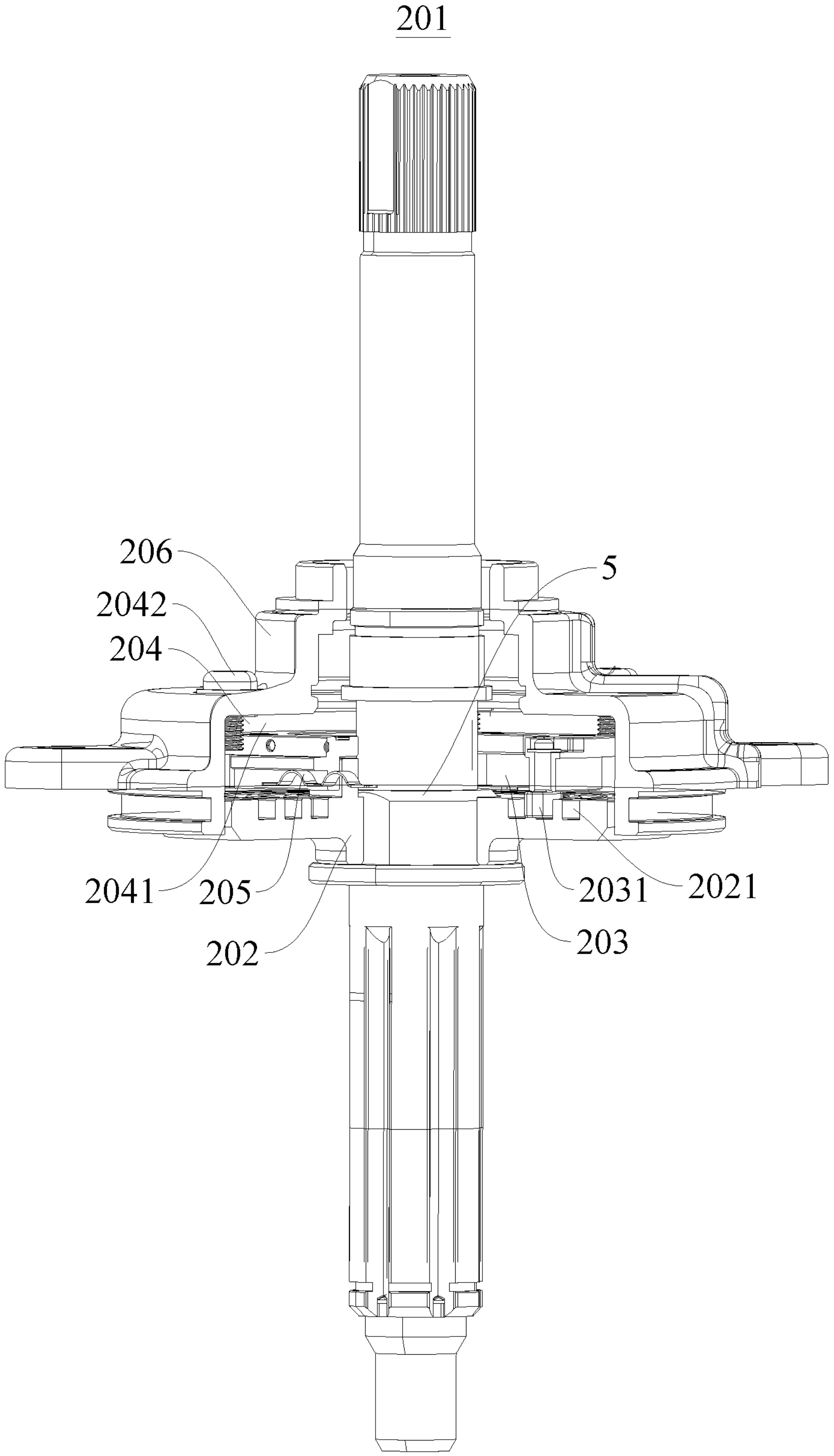
FIG. 10 is a schematic cross-sectional structural view of a turning-angle limiting mechanism according to an embodiment of the present disclosure.

In some embodiments of the present disclosure, as shown in FIG. 10, the vehicle steering system 200 further includes a turning-angle limiting mechanism 201. The turning-angle limiting mechanism 201 includes a turning disk 202 and a stopper 203. At least one mating structure is provided on the turning disk 202, and a first limiting structure and a second limiting structure are provided on the stopper 203. The turning disk 202 rotates and brings along the stopper 203 to move, so as to cause the mating structure to abut against one of the first limiting structure and the second limiting structure. When the mating structure abuts against the first limiting structure, the turning disk 202 is in a first limit position, and when the mating structure abuts against the second limiting structure, the turning disk 202 is in a second limit position.

For example, the turning disk 202 may be fixed to the steering shaft 5. When the driver manipulates the steering wheel 210 of the vehicle to bring along the steering shaft 5 to rotate in a first direction of rotation, such as the clockwise direction, the turning disk 202 can rotate in the first direction of rotation along with the steering shaft 5 and bring along the stopper 203 to move. When the mating structure abuts against the first limiting structure, the turning disk 202 rotates to the first limit position, whereupon the turning disk 202 cannot continue rotating in said first direction of rotation and can only rotate in a second direction of rotation, such as the anticlockwise direction, opposite to the first direction of rotation, so as to achieve angular limiting of the steering shaft 5 in the first direction of rotation. When the driver manipulates the steering wheel 210 of the vehicle to bring along the steering shaft 5 to rotate in a second direction of rotation, such as the anticlockwise direction, the turning disk 202 can rotate in the second direction of rotation along with the steering shaft 5 and bring along the stopper 203 to move. When the mating structure abuts against the second limiting structure, the turning disk 202 rotates to the second limit position, whereupon the turning disk 202 cannot continue rotating in the second direction of rotation and can only rotate in the first direction of rotation, so as to achieve angular limiting of the steering shaft 5 in the second direction of rotation. In an embodiment, to ensure that the steering wheel 210 and the turning disk 202 are angularly aligned, the turning disk 202 can be positioned circumferentially by using a flat key and then press-fitted around the steering shaft 5.

As such, when the turning disk 202 is in the first limit position or the second limit position, the mating structure can abut against the first limiting structure or the second limiting structure, and further rotation of the turning disk 202 can be limited, so that the limitation of the turning angle of the turning disk 202 can be achieved, and the turning-angle limiting mechanism 201 has a simple structure and high reliability. Moreover, when transfer of steering torque between the steering wheel 210 and the steering gear 209 of the vehicle steering system 200 is switched off, the case where parts, such as the clock spring and the angle sensor, are damaged due to random rotation of the steering wheel 210 can be effectively avoided. Moreover, with the configuration of the stopper 203 described above, the mating structure can abut against the corresponding first limiting structure or second limiting structure only when the turning disk 202 is in the first limit position or the second limit position. When the turning disk 202 is in other positions, the mating structure can be staggered with respect to the first limiting structure and the second limiting structure, so as to achieve large-angle limitation by the turning-angle limiting mechanism 201, thereby satisfying the steering demand of the vehicle.

In a further embodiment of the present disclosure, referring to FIG. 10, a mating groove 2021 is provided on the turning disk 202, and a guiding shaft 2031 is provided on the stopper 203. The guiding shaft 2031 is movably mated in the mating groove 2021. The turning disk 202 brings along the stopper 203 to move via the guiding shaft 2031. As such, with the configuration of the mating groove 2021 and the guiding shaft 2031 described above, the turning disk 202 is enabled to bring along the stopper 203 to move during its rotation, and the guiding shaft 2031 can be mated with the mating groove 2021 so that the turning disk 202 may have a large turning angle (e.g., greater than 360°), so as to achieve large-angle limitation, thereby sufficiently satisfying the steering requirement of the vehicle.

In some embodiments of the present disclosure, referring to FIG. 10, the mating groove 2021 may be a helical groove. When the guiding shaft 2031 is positioned at two ends of the mating groove 2021, the stopper 203 is at the first limit position or the second limit position. The mating groove 2021 includes multiple mating segments, each of a circular-arc shape. As such, with the configuration of the multiple mating segments that extend in circular-arc shapes as described above, when the guiding shaft 2031 is mated in the mating segments, the friction between the guiding shaft 2031 and the mating segments is nearly zero, so that the friction loss between the guiding shaft 2031 and the mating segments can be effectively reduced, thereby extending the service life of the whole vehicle steering system 200. In an embodiment, the guiding shaft 2031 may be a limiting pin, but is not limited thereto.

In some embodiments of the present disclosure, referring to FIG. 10, the turning-angle limiting mechanism 201 further includes a fastener 204. A guiding groove 2041 is formed on the fastener 204. The stopper 203 is movably mated in the guiding groove 2041, so that when the turning disk 202 is rotating, the stopper 203 moves in the guiding groove 2041. For example, referring to FIG. 10, the fastener 204 may be fixed to the shell 206 via a fastening screw 2042. The guiding groove 2041 may extend in the radial direction of the turning disk 202. The stopper 203 is mated in the guiding groove 2041 and is movable relative to the guiding groove 2041. During the rotation of the turning disk 202 around the central axis of the turning disk 202, the guiding shaft 2031 moves along the mating groove 2021. As the guiding shaft 2031 is provided on the stopper 203, the guiding shaft 2031 brings along the stopper 203 to move in the guiding groove 2041 relative to the fastener 204. As such, with the configuration of the guiding groove 2041 described above, the guiding groove 2041 can provide effective limiting and guiding, so that the stopper 203 can move along the guiding groove 2041 and rotation of the stopper 203 is limited, thereby ensuring the reliability of limiting by the turning-angle limiting mechanism 201.

In some embodiments of the present disclosure, referring to FIG. 10, an elastic member 205 may be provided between the inner wall of the guiding groove 2041 and the stopper 203. An elastic coating is provided on the stopper 203 for pretension and abrasion-proof. As such, the elastic member 205 provided can reduce the friction between the inner wall of the guiding groove 2041 and the stopper 203, reduce the wear in the fastener 204 and the stopper 203, make movement of the stopper 203 more stable and smooth, and increase the moving speed of the stopper 203. Moreover, the elastic member 205 can further prevent noise generated from contact between the stopper 203 and the inner wall of the guiding groove 2041, so that the turning-angle limiting mechanism 201 has higher operating efficiency and reliability. In an embodiment, the elastic member 205 may be a leaf spring but is not limited thereto.

It should be noted that, the turning-angle limiting mechanism 201 is not limited to the structure described above, but may adopt, for example, a small tooth number difference reducer structure or a nut-lead-screw limiting structure, or the like.

In some embodiments of the present disclosure, as shown in FIGS. 2-6, the vehicle steering system 200 further includes a shell 206. At least one of the first transmission member 1 and the second transmission member 2 of the clutch device 100 is at least partially arranged/disposed in the shell 206. The driven member 32 of the clutch device 100 is arranged in the shell 206. The end of the shell 206 away from the first transmission member 1 is provided with a dust-proof cover 207.

For example, in the embodiment shown in FIGS. 2-6, the shell 206 includes an upper shell 2061 and a lower shell 2062. The upper shell 2061 and the lower shell 2062 may be machined to have a mating torus to ensure the installation coaxiality, while radial sealing may be provided between the upper shell 2061 and the lower shell 2062 by using a first seal ring 2063, such as an O-shaped seal ring, and the upper shell 2061 and the lower shell 2062 are fastened via a first bolt assembly 2064. A support member 208 is fixed to the upper shell 2061 and the dust-proof cover 207 may be nested in the support member 208. During the installation, the dust-proof cover 207 may be press-fitted to the front panel of the vehicle. In an embodiment, the dust-proof cover 207 may be a rubber dust-proof cover.

As such, with the configuration of the dust-proof cover 207 described above, dust and waterproof as well as sound insulation can be achieved for the vehicle steering system 200, thereby improving the reliability of the vehicle steering system 200 and riding comfort in the vehicle.

In some embodiments of the present disclosure, the vehicle steering system 200 may further include a hand-feel simulation device and a control unit. The hand-feel simulation device can simulate the hand feel of steering in transfer of steering torque between the steering wheel 210 and the steering gear 209 when the transfer of steering torque between the steering wheel 210 and the steering gear 209 is switched off. The control unit may interact with the vehicle to identify necessary signals and feedback, via a sensor, the hand feel of gaming required by the driver.

The vehicle steering system 200 according to an embodiment of the present disclosure will be described in detail below with reference to FIGS. 1-10.

Figure 6:
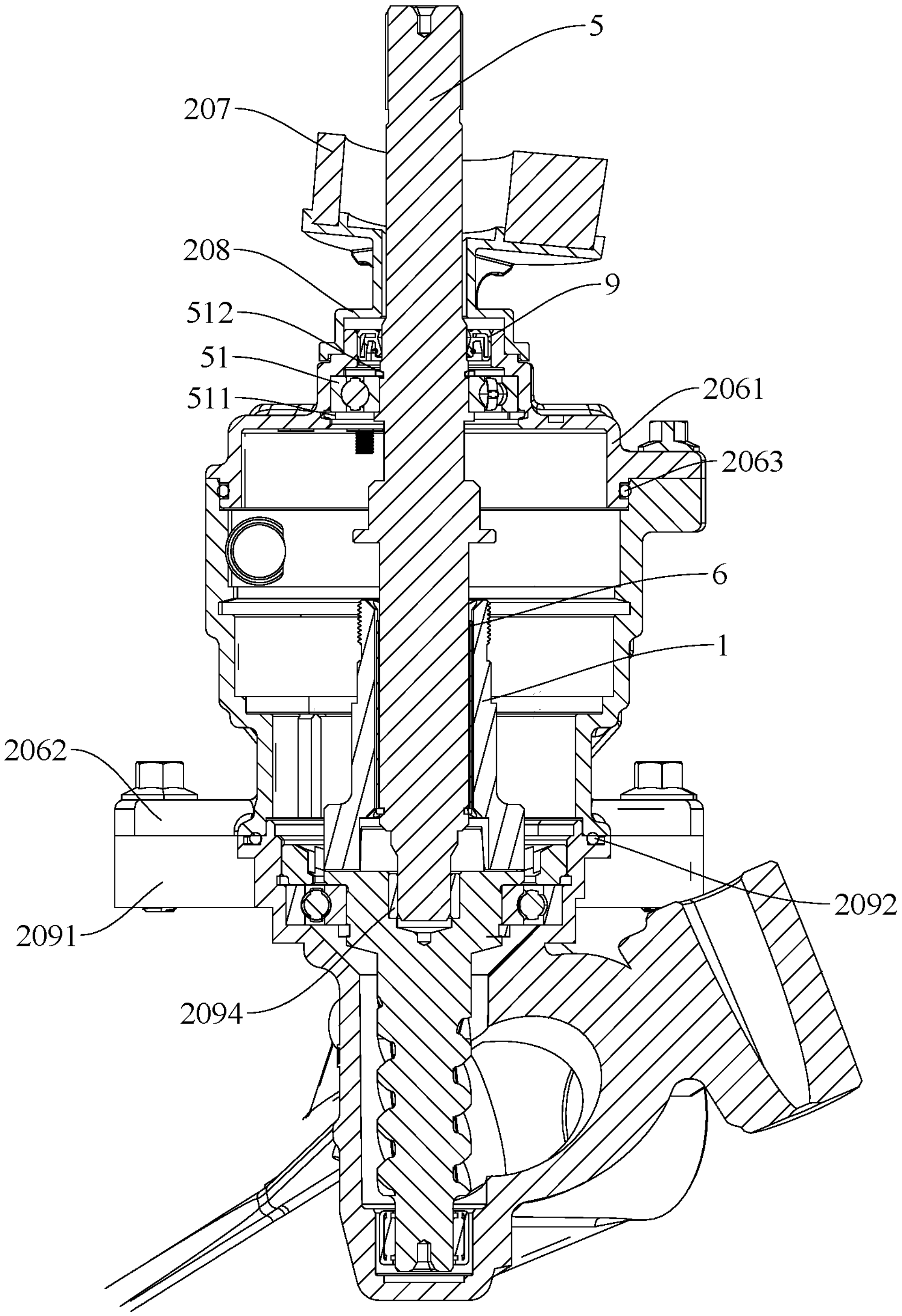
FIG. 6 is a schematic cross-sectional structural view of a clutch device according to an embodiment of the present disclosure.

As shown in FIGS. 6 and 7, during assembly, the driver 311 is fixed to the upper shell 2061 via an installing screw 3111, and joint surfaces of the driver 311 and the upper shell 2061 may be sealed with a second seal ring, such as an O-shaped seal ring. The output shaft of the driver 311 is positioned relative to the first bearing 2065, such as a deep-groove ball bearing, which is press-fitted to the lower shell 2062 to ensure the coaxiality, while the first bearing 2065 is pressed with a screw plug 3131 and thread sealant is applied for sealing. The driver 311, such as a motor, may be arranged/disposed in the radial direction of the steering shaft 5, or arranged parallel to the axial direction of the steering shaft 5 in the form of integrated motor in cooperation with ball-screw transmission.

The third transmission member 312 is installed to the lower shell 2062 via a second bearing 3121, such as a double-row angular contact bearing. One side of the outer ring of the second bearing 3121 abuts against the shaft shoulder of the lower shell 2062, and the other side the outer ring is axially positioned with a first anti-backlash baffle ring 3122, such as an anti-backlash baffle ring for holes; and one side of the inner ring of the second bearing 3121 abuts against the shaft shoulder of the third transmission member 312, and the other side of the inner ring is axially positioned with a second anti-backlash baffle ring 3123, such as an anti-backlash baffle ring for shafts, thereby achieving installation and positioning of the third transmission member 312 relative to the lower shell 2062.

The steering shaft 5 is positioned and installed relative to the upper shell 2061 via a third bearing 51, such as a deep-groove ball bearing. One side of the outer ring of the third bearing 51 abuts against the shaft shoulder of the upper shell 2061, and the other side of the outer ring is axially positioned by a third anti-backlash baffle ring 511, such as an anti-backlash baffle ring for holes; and one side of the inner ring of the third bearing 51 abuts against the shaft shoulder of the steering shaft 5, and the other side of the inner ring is axially positioned by a fourth anti-backlash baffle ring 512, such as an anti-backlash baffle ring for shafts, thereby achieving installation and positioning of the steering shaft 5 relative to the upper shell 2061. The clutch device 100 includes an oil seal 9. The outer ring of the oil seal 9 is press-fitted to the upper shell 2061. The inner ring of the oil seal 9 is in dynamic seal with respect to the steering shaft 5, thereby ensuring that the whole vehicle steering system 200 meets the dust-proof and water-proof level requirements. The steering gear 209 includes a steering gear shell 2091. The steering gear shell 2091 and the lower shell 2062 are machined to have a mating torus to ensure the installation coaxiality, while axial sealing is provided with a third seal ring 2092, such as an O-shaped seal ring. After positioning, they are fastened with a second bolt assembly 2093. Meanwhile, the steering shaft 5 is mated with the gear shaft of the steering gear 209 via a needle roller bearing 2094 to ensure the coaxiality.

As shown in FIGS. 4 and 5, when the first transmission member 1 is in the jointed position, the steering torque from the driver is transferred to the steering shaft 5 via the steering column 211. The steering shaft 5 transfers the steering torque to the first transmission member 1 via the ball-slip assembly 6. As the first transmission member 1 and the second transmission member 2 are jointed at this time, the steering gear 209 can be brought along to rotate. When the first transmission member 1 is in the disjointed position, the first transmission member 1 and the second transmission member 2 are disjointed. At this time, the first transmission member 1 can rotate freely relative to the second transmission member 2, so as to break off the mechanical transfer chain of the vehicle steering system 200. In the gaming mode, the operation on the steering wheel 210 by the driver cannot be transferred to the vehicle wheel, thereby achieving decoupling of the vehicle steering system 200.

The vehicle steering system 200 according to an embodiment of the present disclosure has the function of decoupling of the mechanical transmission chain. The clutch device 100 can be applied as a platform. For example, it can be installed on the steering shaft 5 so that the steering wheel 210 can rotate freely without changing the hard point of the original vehicle steering system. As such, it can be ensured that the hand feel of steering during driving remains consistent with the original state when the first transmission member 1 is in the jointed position, with little change to the original vehicle steering system.

The vehicle according to an embodiment in the third aspect of the present disclosure (not shown) includes the vehicle steering system 200 according to the embodiment in the second aspect of the present disclosure described above.

In the vehicle according to an embodiment of the present disclosure, with use of the vehicle steering system 200 described above, transfer and switch-off of transfer of steering torque between the steering wheel 210 and the vehicle wheel can be effectively achieved, and the transmission efficiency and reliability are high.

Other configurations and operations of the vehicle according to the embodiments of the present disclosure will not be described in detail herein.

In the description of the present disclosure, it should be understood that orientation or position relationships indicated by the terms such as “center”, “longitudinal”, “transverse”, “length”, “width”, “thickness”, “upper”, “lower”, “front”, “back”, “left”, “right”, “vertical”, “horizontal”, “top”, “bottom”, “inner”, “outer”, “clockwise”, “anticlockwise”, “axial”, “radial”, and “circumferential” are based on orientation or position relationships shown in the drawings, and are used only for ease and brevity of illustration and description, rather than indicating or implying that the mentioned device or elements must have a particular orientation or must be constructed and operated in a particular orientation. Therefore, such terms should not be construed as limitation of the present disclosure.

In description of the present disclosure, the words “first feature” and “second feature” may include one or more of this feature.

In description of the present disclosure, it should be noted that unless otherwise explicitly specified or defined, the terms “mount/install”, “joint”, and “connect” should be understood in a broad sense. For example, the connection may be a fixed connection, a detachable connection, or an integral connection; or the connection may be a mechanical connection or an electrical connection; or the connection may be a direct connection, an indirect connection through an intermediate medium, or internal communication between two elements. A person of ordinary skill in the art may understand the meanings of the foregoing terms in the present disclosure according to the situations.

In the descriptions of this specification, descriptions using reference terms “an embodiment”, “some embodiments”, “an exemplary embodiment”, “an example”, “a specific example”, or “some examples” or the like mean that specific characteristics, structures, materials, or features described with reference to the embodiment or example are included in at least one embodiment or example of the present disclosure. In this specification, the illustrative expression of the above terms is not necessarily referring to the same embodiment or example.

Although the embodiments of the present disclosure have been shown and described, a person of ordinary skill in the art should understand that various changes, modifications, substitutions and variations may be made to the embodiments without departing from the principles and gist of the present disclosure, and the scope of the present disclosure is defined by the claims and equivalents thereof.

What is claimed is:

1. A clutch device, comprising:

a first transmission member and a second transmission member, wherein the first transmission member is configured to move between a jointed position and a disjointed position, when the first transmission member is in the jointed position, the first transmission member is jointed with the second transmission member to transfer torque, and when the first transmission member is in the disjointed position, the first transmission member is disjointed from the second transmission member to stop transferring the torque;

a driving mechanism, comprising a driving device and a driven member, wherein the driven member is connected with the driving device and the first transmission member in transmission, the driving device drives the driven member to move to drive the first transmission member to move between the jointed position and the disjointed position, and a direction of movement of the driven member is parallel to a direction of movement of the first transmission member; and a locking device configured to switch between a locking state and an unlocking state, wherein when the locking device is in the locking state, the locking device locks the first transmission member in the jointed position, and when the locking device is in the unlocking state, the locking device unlocks the first transmission member.

2. The clutch device of claim 1, wherein a central axis of the driven member and a central axis of the first transmission member extend along the direction of movement of the driven member, the first transmission member and the driven member are fixed relatively to each other in an axial direction of the driven member, and the first transmission member and the driven member are configured to rotate relatively to each other.

3. The clutch device of claim 2, wherein a bearing is disposed between the first transmission member and the driven member, and the bearing comprises an inner ring, an outer ring, and multiple rolling elements configured to roll between the inner ring and the outer ring; and a first shaft shoulder and a first fastener are disposed axially at a first interval on the first transmission member, the inner ring abuts between the first shaft shoulder and the first fastener, a second shaft shoulder and a second fastener are disposed axially at a second interval on the driven member, and the outer ring abuts between the second shaft shoulder and the second fastener, such that the first transmission member and the driven member are fixed relatively to each other in the axial direction of the driven member and rotate relatively to each other in a circumferential direction of the driven member.

4. The clutch device of claim 1, further comprising:

a steering shaft, wherein the first transmission member is sleeved over the steering shaft, the first transmission member and the steering shaft are fixed relatively to each other in a circumferential direction of the steering shaft, and the first transmission member is configured to move relatively to the steering shaft in an axial direction of the steering shaft between the jointed position and the disjointed position.

5. The clutch device of claim 1, wherein the driven member comprises a lead screw; and the driving device comprises:

a driver; and a third transmission member connected with the driver in transmission, an inner circumferential face of the third transmission member having an inner thread coupled with the driven member.

6. The clutch device of claim 5, wherein the driver has an output shaft; and the driving device further comprises:

a driving member fixed to the output shaft, the driving member coupled with the third transmission member to drive the third transmission member to rotate.

7. The clutch device of claim 6, wherein the driving member comprises a worm, and the third transmission member comprises a worm wheel meshed with the worm.

8. The clutch device of claim 1, further comprising:

a controller; and a position detection assembly communicating with the controller, wherein the position detection assembly is configured to detect a position of the first transmission member and send a positional signal indicative of the position of the first transmission member to the controller.

9. The clutch device of claim 8, wherein the position detection assembly comprises:

a detector body communicating with the controller; and a detection device disposed on the driven member, wherein the detection device communicates with the detector body, and the detector body obtains the position of the first transmission member by detecting a position of the detection device and sends the positional signal to the controller.

10. The clutch device of claim 9, wherein the detector body comprises a sensor body, and the detection device comprises a magnet cover and a detection magnet disposed on the magnet cover.

11. The clutch device of claim 1, wherein the locking device comprises a locking core; and the driven member has a step portion, wherein when the locking device is in the locking state, the locking core abuts against the step portion to retain the first transmission member in the jointed position via the driven member, and when the locking device is in the unlocking state, the locking core retracts to be separated from the step portion.

12. The clutch device of claim 1, wherein one of the first transmission member and the second transmission member comprises at least one protrusion, and the other one of the first transmission member and the second transmission member comprises at least one recess; and when the first transmission member is in the jointed position, the at least one protrusion is engaged in the at least one recess, and when the first transmission member is in the disjointed position, the at least one protrusion is disengaged from the at least one recess.

13. A vehicle steering system comprising a clutch device, wherein the clutch device comprises:

a first transmission member and a second transmission member, wherein the first transmission member is configured to move between a jointed position and a disjointed position, when the first transmission member is in the jointed position, the first transmission member is jointed with the second transmission member to transfer torque, and when the first transmission member is in the disjointed position, the first transmission member is disjointed from the second transmission member to stop transferring the torque;

a driving mechanism, comprising a driving device and a driven member, wherein the driven member is connected with the driving device and the first transmission member in transmission, the driving device drives the driven member to move to drive the first transmission member to move between the jointed position and the disjointed position, and a direction of movement of the driven member is parallel to a direction of movement of the first transmission member; and a locking device configured to switch between a locking state and an unlocking state, wherein when the locking device is in the locking state, the locking device locks the first transmission member in the jointed position, and when the locking device is in the unlocking state, the locking device unlocks the first transmission member.

14. The vehicle steering system of claim 13, wherein a central axis of the driven member and a central axis of the first transmission member extend along the direction of movement of the driven member, the first transmission member and the driven member are fixed relatively to each other in an axial direction of the driven member, and the first transmission member and the driven member are configured to rotate relatively to each other.

15. The vehicle steering system of claim 14, wherein a bearing is disposed between the first transmission member and the driven member, and the bearing comprises an inner ring, an outer ring, and multiple rolling elements configured to roll between the inner ring and the outer ring; and a first shaft shoulder and a first fastener are disposed axially at a first interval on the first transmission member, the inner ring abuts between the first shaft shoulder and the first fastener, a second shaft shoulder and a second fastener are disposed axially at a second interval on the driven member, and the outer ring abuts between the second shaft shoulder and the second fastener, such that the first transmission member and the driven member are fixed relatively to each other in the axial direction of the driven member and rotate relatively to each other in a circumferential direction of the driven member.

16. The vehicle steering system of claim 13, further comprising:

a steering shaft, wherein the first transmission member is sleeved over the steering shaft, the first transmission member and the steering shaft are fixed relatively to each other in a circumferential direction of the steering shaft, and the first transmission member is configured to move relatively to the steering shaft in an axial direction of the steering shaft between the jointed position and the disjointed position.

17. The vehicle steering system of claim 13, wherein the driven member comprises a lead screw; and the driving device comprises:

a driver; and a third transmission member connected with the driver in transmission, an inner circumferential face of the third transmission member having an inner thread coupled with the driven member.

18. The vehicle steering system of claim 17, wherein the driver has an output shaft; and the driving device further comprises:

a driving member fixed to the output shaft, the driving member coupled with the third transmission member to drive the third transmission member to rotate.

19. A vehicle comprising a vehicle steering system comprising a clutch device, wherein the clutch device comprises:

a first transmission member and a second transmission member, wherein the first transmission member is configured to move between a jointed position and a disjointed position, when the first transmission member is in the jointed position, the first transmission member is jointed with the second transmission member to transfer torque, and when the first transmission member is in the disjointed position, the first transmission member is disjointed from the second transmission member to stop transferring the torque; and a driving mechanism, comprising a driving device and a driven member, wherein the driven member is connected with the driving device and the first transmission member in transmission, the driving device drives the driven member to move to drive the first transmission member to move between the jointed position and the disjointed position, and a direction of movement of the driven member is parallel to a direction of movement of the first transmission member; and a locking device configured to switch between a locking state and an unlocking state, wherein when the locking device is in the locking state, the locking device locks the first transmission member in the jointed position, and when the locking device is in the unlocking state, the locking device unlocks the first transmission member.

* * * * *